(12) United States Patent
Karp

(10) Patent No.: US 6,426,758 B2
(45) Date of Patent: *Jul. 30, 2002

(54) USER PROGRAMMABLE SCROLLING DISPLAY

(76) Inventor: William Karp, 23425 Park Hermosa, Calabasas, CA (US) 91302

( * ) Notice: Subject to any disclaimer, the term of this patent is extended or adjusted under 35 U.S.C. 154(b) by 0 days.

This patent is subject to a terminal disclaimer.

(21) Appl. No.: 09/766,904

(22) Filed: Jan. 23, 2001

Related U.S. Application Data

(63) Continuation-in-part of application No. 09/490,121, filed on Jan. 24, 2000, now Pat. No. 6,288,701.

(51) Int. Cl.[7] ................................................. G09G 5/34

(52) U.S. Cl. ....................................................... 345/685

(58) Field of Search ................................. 345/684, 685; 340/7.39, 7.4, 7.53, 7.63

(56) References Cited

U.S. PATENT DOCUMENTS

| 4,160,242 | A | * | 7/1979 | Fowler et al. |
| 4,500,880 | A | * | 2/1985 | Gomersall et al. |
| 4,952,927 | A | * | 8/1990 | DeLuca et al. |
| 5,281,962 | A | * | 1/1994 | Vanden Heuvel et al. |
| 5,398,022 | A | * | 3/1995 | Lipp |
| 5,430,436 | A | * | 7/1995 | Fennell |
| 5,910,653 | A | * | 6/1999 | Campo |
| 6,141,018 | A | * | 10/2000 | Beri et al. |
| 6,288,701 | B1 | * | 9/2001 | Karp |

* cited by examiner

Primary Examiner—Jeffery Brier
(74) Attorney, Agent, or Firm—Richard A. Joel, Esq.

(57) ABSTRACT

A user programmable scrolling display for attachment to clothing, backpacks and accessories wherein one may create, edit, store and display a multiplicity of messages by manipulating control buttons which comprise less than a full keyboard. The display includes a compact case with control circuitry and a battery power source therein and resilient snap-lock fingers on the exterior thereof which cooperate with a clip to affix the display to clothing.

8 Claims, 2 Drawing Sheets

USER PROGRAMMABLE SCROLLING DISPLAY

CROSS-REFERENCE TO RELATED APPLICATIONS

This is a continuation-in-part of application Ser. No. 09/490,121 filed Jan. 24, 2000, now U.S. Pat. No. 6,288,701.

REFERENCE TO A MICROFICHE APPENDIX

None

STATEMENT REGARDING FEDERALLY SPONSORED RESEARCH OR DEVELOPMENT

Research and development of the present invention and application have not been federally sponsored, and no rights are given under any Federal program.

BACKGROUND OF THE INVENTION

1. Field of the Invention

This invention relates to user programmable scrolling displays such as wearable badges, advertising modules and modules to be integrated into apparel and accessories. The invention comprises a liquid crystal display mounted in a case with an internal printed circuit board and exterior control buttons less than a full keyboard to activate the scrolling display to present various user created messages.

2. Description of the Related Art Including Information Disclosed Under 37 CFR §§1.97–1.98

The prior art includes patents that disclose a variety of hand held and programmable displays. Scrolling displays, per se, are also shown in the prior art. Generally, user programmable scrolling displays (UPSDs) are operated by connection to an external AC power source. Such displays also require connection to a full external keyboard where the individual keys correspond to the letters of the alphabet and provide a means to input numbers and punctuation. The UPSDs are commonly used for signboards, message boards, etc. at airports, other public facilities and by businesses and institutions. A multiplicity of light emitting diodes (LEDs) is generally utilized and their high power consumption requires connection to AC. Further, the units are typically large, bulky and heavy and require a separate keyboard to be connected or remotely interfaced with the UPSD to create custom messages.

U.S. Pat. No. 5,841,878 to Arnold, et al discloses a card sized hand held sound and display unit that will display an image or produce sound based upon the depression of a switch. A data scroll switch and a LCD display are also disclosed.

U.S. Pat. No. 5,625,608 to Grewe, et al discloses a hand held remote control unit with a LCD display. The display has a number of menus that are modified by the control buttons on the front of the unit.

U.S. Pat. No. 5,893,798 to Stambolic, et al discloses a hand held electronic game with a number of buttons used to modify an LCD or LED display. The device includes a programmable microcomputer and a scrolling display.

U.S. Pat. No. 5,602,728 to Madden discloses a hand held programmable LCD display unit that utilizes only three buttons to control the limited messages displayed on the unit.

Other patents of interest include U.S. Pat. Nos. 4,768,300; 5,047,952; 5,317,671; 5,363,092; 5,388,061; 5,826,235; 5,890,121; and 5,892,455.

The prior art, while disclosing the general concept of programmable displays fails to anticipate the unique aspects of applicant's invention disclosed hereinafter. SUMMARY OF THE INVENTION This invention relates to displays and particularly to self-contained user programmable scrolling displays. The display comprises a liquid crystal display (LCD) mounted in a case with a plurality of control buttons that are less than a full keyboard extending outwardly therefrom. A printed circuit board is mounted within the case and coupled to the LCD display to activate the various messages in a manner determined by the control buttons. A battery power source and microprocessor are also mounted within the case. The internal circuitry will not be discussed in detail since the general teachings are available in the prior art cited above.

The essence of the invention is a user programmable scrolling display in which one may create, edit, store and display a multiplicity of personal messages by manipulating the integral control buttons. One may also vary the scrolling speed and choose the number of times a message will repeat. The display is mounted in a unique case with an integral pin to attach to clothing in a badge-like arrangement or may be used affixed to a counter or vertical surface as a self-contained display module or may be used as a stand alone display on a surface such as a counter.

The essence of the invention is a user programmable scrolling display in which one may create, edit, store and display a multiplicity of personal messages by manipulating the integral control buttons. One may also vary the scrolling speed and choose the number of times a message will repeat. The display is mounted in a unique case with an integral pin to attach to clothing in a badge-like arrangement or may be used affixed to a counter or vertical surface as a self-contained display module.

In an alternate embodiment of the invention, the display may be affixed to tee shirts, caps and other apparel as well as bags and backpacks using a special attachment clip that engages fingers on the display case. This permits the case to be removed to allow cleaning of the apparel and ready assembly to the apparel.

In an additional embodiment, the display may be programmed using an external computer that connects to the display through a two-pin serial interface. A two pin connector passes through two holes on the back of the case and contact pads on the printed circuit board.

Accordingly, an object of this invention is to provide a new and improved user programmable scrolling display.

Another object of this invention is to provide a new and improved user programmable scrolling display that may be attached to clothing.

Another object of this invention is to provide a self contained user programmable display that is extremely light and compact to facilitate a multiplicity of uses.

A further object of this invention is to provide a LCD display which is mounted within a case having control buttons extending outwardly therefrom to control a scrolling display and including a unique pin and clip mounted to said case to affix the display on apparel or other designated surfaces.

A still further object of this invention is to provide a new and improved user programmable display that is programmed using integral control buttons that are less than a full keyboard compliment.

A more specific object of this invention is to provide a new and improved user programmable display as a small lightweight attachment for integration with apparel/accessories such as caps, tee shirts, and backpacks having programming control buttons that are less than a full keyboard.

BRIEF DESCRIPTION OF THE DRAWINGS

The above and other objects of the invention may be more readily seen when viewing in conjunction with the accompanying drawings wherein.

DETAILED DESCRIPTION OF THE INVENTION

Figure 1:
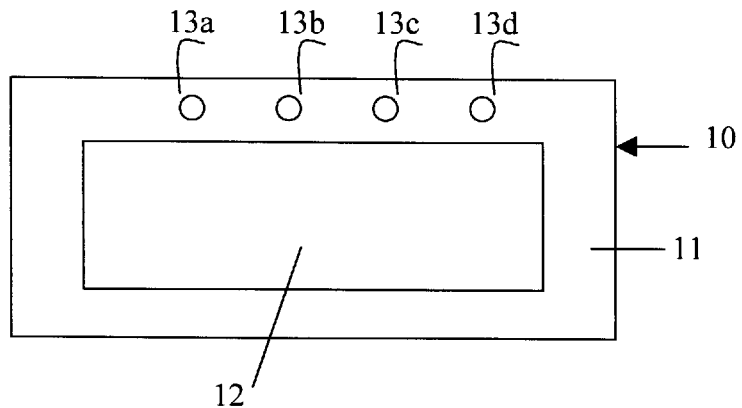
FIG. 1 is a front view of the display including control buttons comprising the invention.

Referring now to the drawings, and in particular FIG. 1, the invention comprises a user programmable scrolling display unit ("UPSD") 10 which is mounted within a plastic case 11 and includes a liquid crystal display (LCD) 12 and a plurality of control buttons 13a–13d on the exterior thereof. The control buttons 13a–13d are less than the number required for a full keyboard and as a result the UPSD may be small and compact permitting a variety of uses.

The LCD 12 presents various messages in a scrolling fashion, such messages created and displayed by manipulation of the four control buttons 13a–13d. It is also possible with the subject display to create, edit, store and display up to ten different scrolling messages, each containing up to two hundred fifty-five characters, and all messages combined ranging up to approximately eight hundred ninety characters. The user may vary the scrolling speed, select the number of times a message repeats before it turns off, select any one of the stored messages to be displayed or may display all of the stored messages in a sequence.

Since the circuitry for scrolling LCD displays is well know and described in the prior art cited herein, the precise circuit and the operation will not be described in detail. Applicant, however, is providing unique uses for such display circuitry in unique displays and structures that are useful, attractive and inexpensive. These displays 10, which are commercially successful, operate on self-contained batteries that enable them to be extremely light and compact. The displays may also involve LED displays although the LCD displays are particularly suitable for use with batteries.

Figure 2:
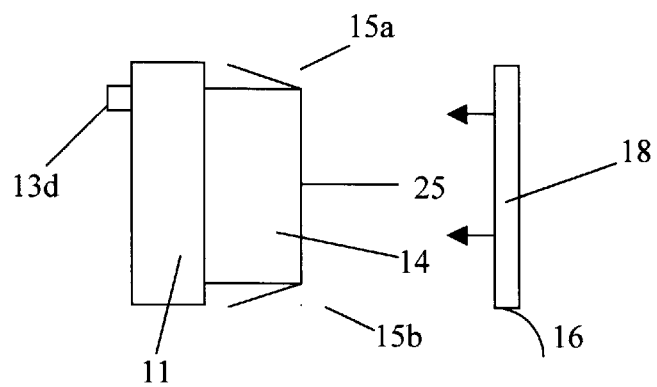
FIG. 2 is a side view of the display comprising the invention and an attachment clip.

FIG. 2 depicts a side view of the display 10 wherein the case 14 protrudes rearwardly from the forward flanged portion 11. The case 14 includes upper and lower resilient snap lock fingers 15a and 15b that engage the attachment clip 16 to hold it firmly in place against clothing in the manner illustrated in FIG. 3. The UPSD display 10 may be affixed to caps, tee shirts, backpacks and other apparel and accessory items.

Figure 3:
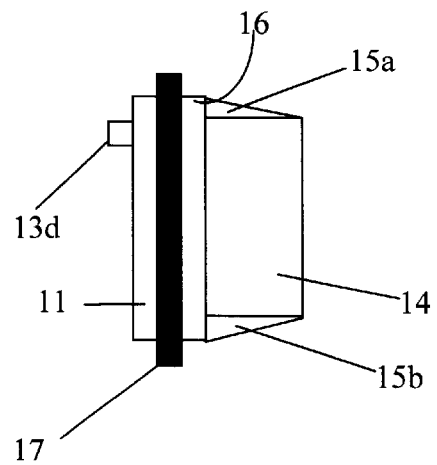
FIG. 3 is a cross-sectional view of the display mounted to fabric with the attachment clip in place.

As shown in FIG. 3, the rearward portion 14 protrudes through a matching aperture in the fabric 17 with the flanged portion 11 and control buttons 13a–d on the exterior thereof. The attachment clip 16 includes an aperture 18 that engages the rearward portion 14 and is held in place against the fabric 17 by the locking fingers 15a–15d. Thus the case 14 is locked in place by snap-lock fingers 15–15d, the number and position of which may vary depending upon the size and position of the rearward portion 14. The case 11 and 14 may be detached from the fabric by using a tool such as a screwdriver to push in each finger until it becomes disengaged from the rearward portion 14 of the case.

Figure 4:
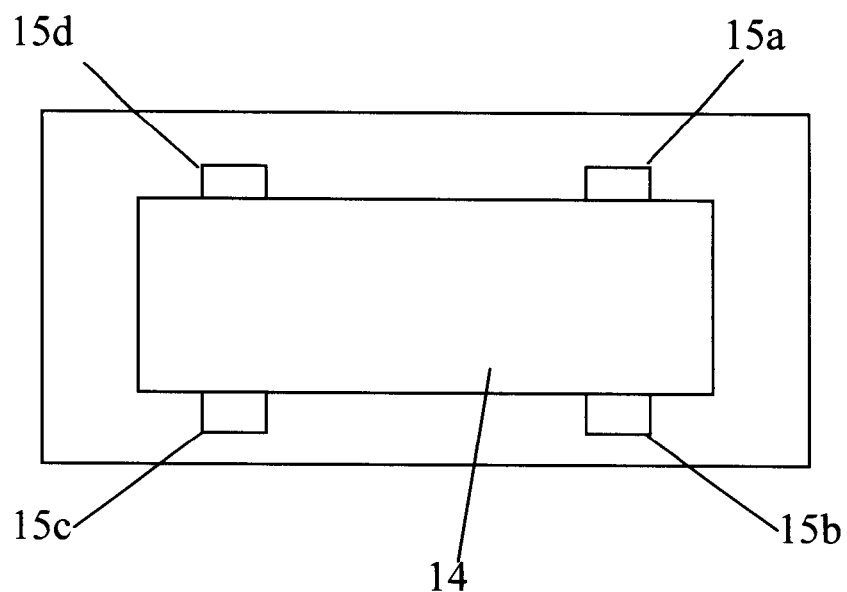
FIG. 4 is a rear view of the display in FIG. 3.

FIG. 4 is a rear view of the display in FIG. 3 showing the attachment fingers 15a–d engaging the rearward portion 14 of the case.

Figure 5:
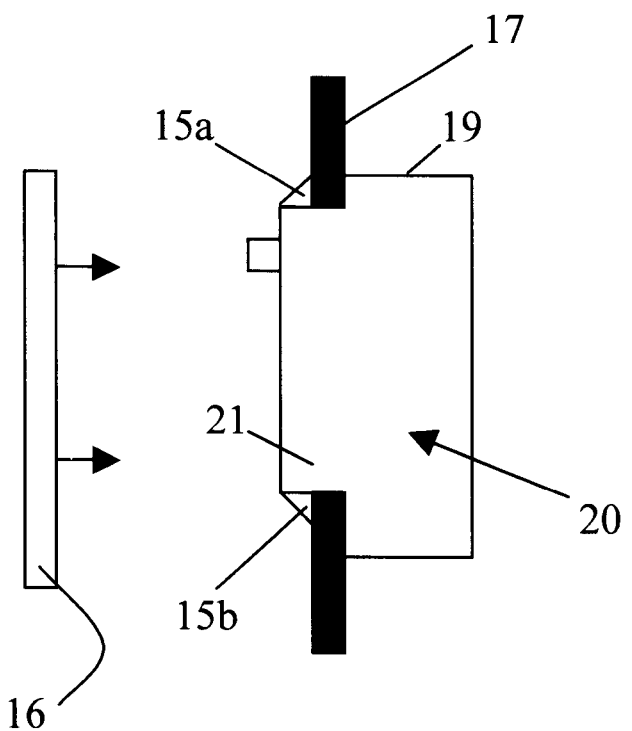
FIG. 5 is an alternate embodiment of the invention in which the flanged portion of the case is at the rear of the fabric and the attachment clip is at the front.

In FIG. 5 an alternate embodiment of the invention, shows the flanged portion 19 of the case 20 in the rear of the fabric 17 with a smaller forward projecting portion 21 extending through an aperture in the fabric 17. The attachment clip 16 slides over snap-lock fingers 15a–d to lock the display 20 in place on the fabric 17.

The display unit 10 may also include a bracket mounted to the rear of the case 14 that engages a mating bracket on a wall for positioning the display unit 10 thereon. Alternatively, the case 14 may include a double-sided foam tape so the unit may be affixed to vertical surfaces. Details of these designs are shown in applicant's pending parent application Ser. No. 09/490,121 filed Jan. 24, 2000. Further serial interface apertures may be included on the rear face 25 for access to the control circuit for alternative programming of said circuit via an external computer.

While the invention has been explained by a detailed description of certain specific embodiments, it is understood that various modifications and substitutions can be made in any of them within the scope of the appended claims, which are intended also to include equivalents of such embodiments.

What is claimed is:

1. A user programmable scrolling display unit for creating, editing, storing and displaying a plurality of messages to be attached to clothing or accessories or to be used as a self-contained module comprising:

a closed case having a front face and a rear face spaced therefrom and side portions joining said faces;

a programmable control circuit mounted within said case;

an integral battery power source coupled to the control circuit within said case;

an LCD display for presenting a scrolling display mounted on the front face and coupled to the control circuit within said case; and, a plurality of control buttons less than a full keyboard extending outwardly from the case, said buttons being coupled to the control circuit to provide a means to create, edit, store, and display messages and also to vary the scrolling speed of messages on the LCD display and to choose the number of times a message will repeat before the display shuts off.

2. A user programmable scrolling display unit for creating, editing, storing and displaying a plurality of messages to be attached to clothing or accessories or to be used as a self-contained module in accordance with claim 1 further including:

clothing or accessories having an aperture to receive the display unit; and, means to attach said display unit to clothing.

3. A user programmable scrolling display unit for creating, editing, storing and displaying a plurality of messages to be attached to clothing or accessories or to be used as a self-contained module in accordance with claim 2 wherein:

the plurality of control buttons extend outwardly from the front face and comprise four in number.

4. A user programmable scrolling display unit for creating, editing, storing and displaying a plurality of messages to be attached to clothing or accessories or to be used as a self-contained module in accordance with claim 2 wherein:

the display case comprises a flanged forward portion and a reduced rearward portion extending through the aperture in the clothing, said rearward portion having a plurality of resilient fingers extending outwardly therefrom; and, an attachment clip having an aperture engaging the rearward portion of the case and being held in place by the resilient fingers against the flanged forward portion to hold clothing therebetween.

5. A user programmable scrolling display unit for creating, editing, storing and displaying a plurality of messages to be attached to clothing or accessories or to be used as a self-contained module in accordance with claim 1 further including:

a pin mounted to the rear of the case for connection to clothing.

6. A user programmable scrolling display unit for creating, editing storing and displaying a plurality of messages to be attached to clothing or accessories or to be used as a self-contained module in accordance with claim 1 further including:

an external computer; and, serial interface apertures on the rear face for access to the control circuit for alternative programming of said circuit with said external computer.

7. A user programmable scrolling display unit for creating, editing, storing and displaying a plurality of messages to be attached to clothing or accessories or to be used as a self-contained module in accordance with claim 1 wherein:

the case is configured to sand alone as a self-contained display module.

8. A user programmable scrolling display unit for creating, editing, storing and displaying a plurality of messages to be attached to clothing or accessories or to be used as a self-contained module comprising:

a closed case having a front portion, having a front face and a rear face spaced therefrom and side portions joining said faces;

said case including enlarged rear portion including the rear face a programmable control circuit mounted within said case;

an integral battery power source coupled to the control circuit within said case;

an LCD display for presenting a scrolling display mounted on the front face and coupled to the control circuit within said case;

a plurality of control buttons less than a full keyboard extending outwardly from the case, said buttons being coupled to the control circuit to provide a means to create, edit, store, and display messages and also to vary the scrolling speed of messages on the LCD display and to choose the number of times a message will repeat before the display shuts off;

clothing or accessories having an aperture to receive the display unit said front portion of the case protruding therethrough; and means to attach said display unit to clothing comprising an attachment clip having an aperture engaging the front portion of the case, said front portion including resilient fingers mounted on the case to engage the attachment clip.

* * * * *